US011402628B2

(12) United States Patent
Kosaka et al.

(10) Patent No.: US 11,402,628 B2
(45) Date of Patent: Aug. 2, 2022

(54) VEHICULAR DISPLAY APPARATUS AND VEHICULAR DISPLAY METHOD

(71) Applicant: NISSAN MOTOR CO., LTD., Kanagawa (JP)

(72) Inventors: Norio Kosaka, Kanagawa (JP); Tetsuya Yamamoto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 765 days.

(21) Appl. No.: 15/323,323

(22) PCT Filed: Jul. 1, 2014

(86) PCT No.: PCT/JP2014/067549
§ 371 (c)(1),
(2) Date: Dec. 30, 2016

(87) PCT Pub. No.: WO2016/002007
PCT Pub. Date: Jan. 7, 2016

(65) Prior Publication Data
US 2017/0146796 A1    May 25, 2017

(51) Int. Cl.
*G02B 27/01*      (2006.01)
*B60K 35/00*     (2006.01)
(Continued)

(52) U.S. Cl.
CPC .............. *G02B 27/01* (2013.01); *B60K 35/00* (2013.01); *B60R 1/00* (2013.01); *B60R 16/02* (2013.01);
(Continued)

(58) Field of Classification Search
CPC .............. G02B 27/01; G02B 2027/014; G02B 2027/0141; B60K 35/00; B60K 2350/106;
(Continued)

(56) References Cited

U.S. PATENT DOCUMENTS

2007/0106475 A1    5/2007 Kondoh
2011/0199197 A1    8/2011 Takatsudo et al.
(Continued)

FOREIGN PATENT DOCUMENTS

DE         19826283 A1    12/1998
EP          1785326 A1     5/2007
(Continued)

*Primary Examiner* — Christopher E Leiby
(74) *Attorney, Agent, or Firm* — Osha Bergman Watanabe & Burton LLP

(57) ABSTRACT

A vehicular display apparatus that displays an image on a windshield of a vehicle has an attention target detector configured to detect an attention target to which attention of a driver of the vehicle needs to be drawn, and calculate a distance from the attention target to the vehicle, and a display controller configured to perform display control that displays an attention mark on the windshield in a superimposed manner such that, from a point of view of the driver, the attention mark is displayed close to the attention target detected by the attention target detector, the attention mark being displayed to draw the attention of the driver to the attention target. The display controller sets a base point at a position of the attention target on the windshield, sets a display position of the attention mark at a position which is a predetermined distance away from the base point.

2 Claims, 4 Drawing Sheets

(51) Int. Cl.
*B60R 16/02* (2006.01)
*B60R 21/00* (2006.01)
*G06V 20/56* (2022.01)
*B60R 1/00* (2022.01)

(52) U.S. Cl.
CPC .............. *B60R 21/00* (2013.01); *G06V 20/56* (2022.01); *B60K 2370/152* (2019.05); *B60K 2370/1529* (2019.05); *B60K 2370/172* (2019.05); *B60K 2370/174* (2019.05); *B60K 2370/188* (2019.05); *B60K 2370/21* (2019.05); *B60K 2370/334* (2019.05); *B60K 2370/52* (2019.05); *B60R 2300/205* (2013.01); *B60R 2300/301* (2013.01); *B60R 2300/308* (2013.01); *B60R 2300/8033* (2013.01); *B60R 2300/8093* (2013.01); *F02D 2200/701* (2013.01); *G02B 2027/014* (2013.01); *G02B 2027/0141* (2013.01); *Y02T 10/84* (2013.01)

(58) Field of Classification Search
CPC .... B60K 2350/2013; B60K 2350/2052; B60K 2350/352; B60R 1/00; B60R 2300/205; B60R 2300/301; B60R 2300/308; B60R 2300/8093; B60R 2300/8033; G06K 9/00791

See application file for complete search history.

(56) References Cited

U.S. PATENT DOCUMENTS

| | | | |
|---|---|---|---|
| 2014/0176350 A1* | 6/2014 | Niehsen | B62D 15/025 340/988 |
| 2015/0158430 A1* | 6/2015 | Dollinger | G02B 27/01 345/420 |
| 2017/0011709 A1* | 1/2017 | Kuwabara | B60K 35/00 |
| 2017/0084176 A1* | 3/2017 | Nakamura | G02B 27/01 |

FOREIGN PATENT DOCUMENTS

| | | |
|---|---|---|
| JP | 2005-067514 A | 3/2005 |
| JP | 2007-153307 A | 6/2007 |
| JP | 2008-046744 A | 2/2008 |
| JP | 2010-108264 A | 5/2010 |
| JP | 2010-120617 A | 6/2010 |

* cited by examiner

TIME $T_0$

TIME $T_1 = T_0 + \Delta t$

TIME $T_0$

TIME $T_1 = T_0 + \Delta t$

VEHICULAR DISPLAY APPARATUS AND VEHICULAR DISPLAY METHOD

BACKGROUND

Technical Field

The present invention relates to a vehicular display apparatus and method for displaying an image on a windshield of a vehicle.

Related Art

Patent Literature 1 discloses a conventional vehicular display apparatus, such as a head-up display, that displays an image on a windshield of a vehicle. The vehicular display apparatus disclosed in Patent Literature 1 displays a target mark on the windshield to mark a preceding vehicle to which attention is to be drawn. Specifically, the target mark is displayed at a position a certain distance away from a position on the windshield at which a driver sees the preceding vehicle, so that the target mark is displayed close to the preceding vehicle in a superimposed manner.

Patent Literature 1: Japanese Patent Application Publication No. 2005-67514

SUMMARY

The conventional vehicular display apparatus described above, however, displays the target mark at a position the certain distance away from a position on the windshield at which the driver sees the preceding vehicle, irrespective of the relative distance between the preceding vehicle and the vehicle. Here, the target mark may not be displayed at an appropriate position when the distance between the vehicle and the preceding vehicle changes. For example, if the preceding vehicle approaches the vehicle, the target mark would be displayed over the preceding vehicle, disabling the driver from seeing the preceding vehicle directly.

The present invention has been proposed in view of the above circumstances, and aims to provide a vehicular display apparatus and method capable of displaying an attention mark always at an appropriate position even when the relative distance between a vehicle and an attention target to which attention is to be drawn changes.

According to one or more embodiments of the present invention, a vehicular display apparatus and method detects an attention target to which attention of a driver of a vehicle needs to be drawn, calculates a distance from the attention target to the vehicle, and performs display control for displaying an attention mark on a windshield in a superimposed manner such that from a point of view of the driver, the attention mark is displayed close to the attention target, the attention mark being displayed to draw the attention of the driver to the attention target. The vehicular display apparatus and method sets a base point at a position of the attention target on the windshield, sets a display position of the attention mark at a position which is a predetermined distance away from the base point, and changes the display position of the attention mark by changing the predetermined distance according to the distance from the attention target to the vehicle.

DETAILED DESCRIPTION

Embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Configuration of the Vehicular Display Apparatus]

Figure 1:
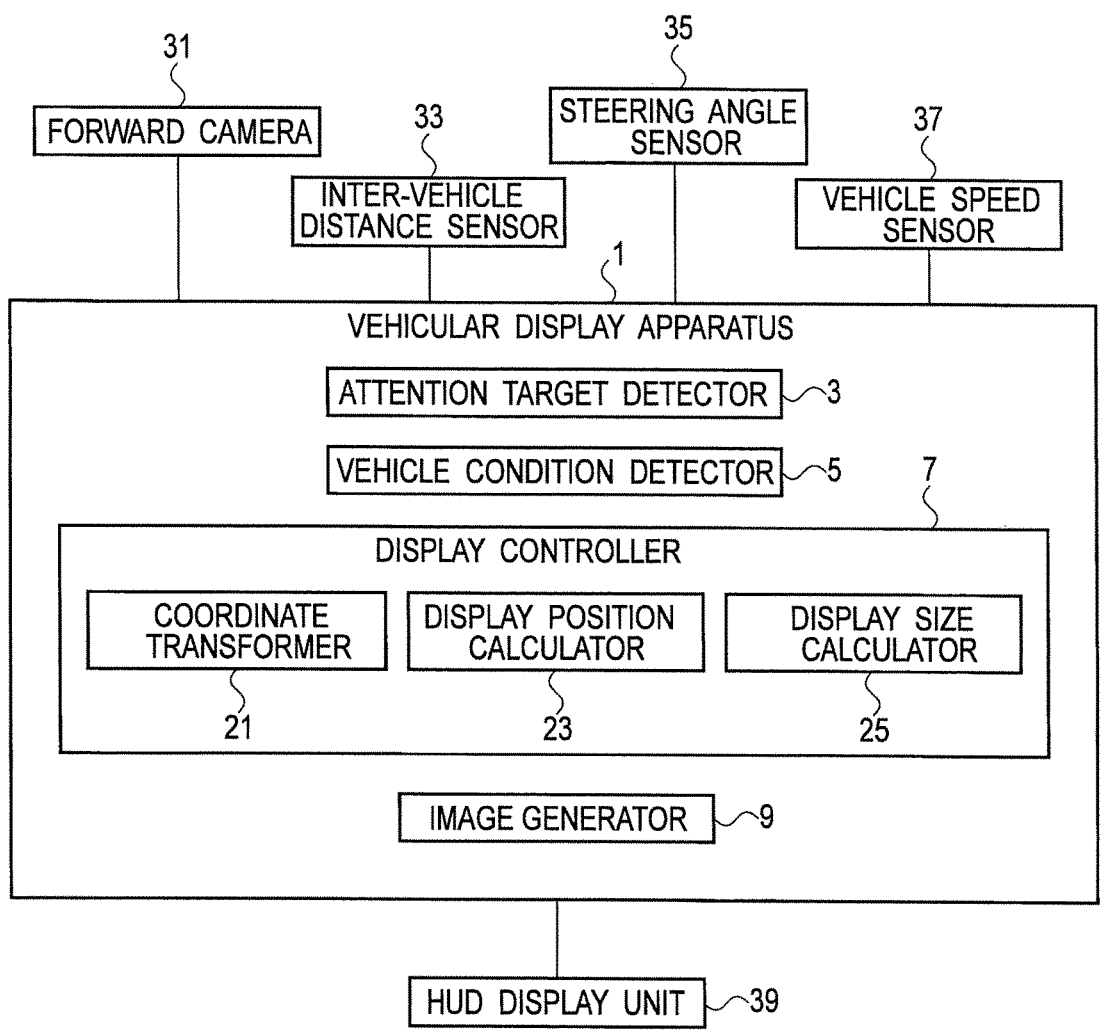
FIG. 1 is a block diagram showing the configuration of a vehicular display apparatus according to one or more embodiments of the present invention.

FIG. 1 is a block diagram showing the configuration of a vehicular display apparatus according to one or more embodiments of the present invention. As shown in FIG. 1, a vehicular display apparatus 1 according to one or more embodiments of the present invention includes an attention target detector 3, a vehicle condition detector 5, a display controller 7, and an image generator 9. The display controller 7 further includes a coordinate transformer 21, a display position calculator 23, and a display size calculator 25.

Herein, the vehicular display apparatus 1 according to one or more embodiments of the present invention functions as a controller for a head-up display (not shown) that displays an image on a windshield of a vehicle. The head-up display controlled by the vehicular display apparatus 1 includes a projector for projecting an image, a screen and a Fresnel mirror for reflecting the image, and the like. The vehicular display apparatus 1 according to one or more embodiments of the present invention is connected to various sensors installed in the vehicle, and is connected especially to a forward camera 31, an inter-vehicle distance sensor 33, a steering angle sensor 35, and a vehicle speed sensor 37. The vehicular display apparatus 1 is also connected to a HUD display unit 39 of the head-up display, and outputs an image generated by the image generator 9 to the HUD display unit 39 to display the image on the windshield of the vehicle.

The attention target detector 3 analyzes an image acquired from the forward camera 31, and detects an attention target to which attention of a driver of the vehicle needs to be drawn. The attention target thus detected is a pedestrian, a bicycle, a preceding vehicle, a parked/stopped vehicle and an obstacle or the like. If a preceding vehicle is to be detected as the attention target, information from the inter-vehicle distance sensor 33 may be used for the detection. Then, the attention target detector 3 detects the position, relative distance, relative speed, size, and the like of the attention target. If the vehicle has a radar installed therein, these pieces of information may be detected by the radar.

The vehicle condition detector 5 acquires data from the various sensors installed in the vehicle, the data indicating the travelling conditions of the vehicle. For example, the vehicle condition detector 5 acquires the inter-vehicle distance to a preceding vehicle from the inter-vehicle distance sensor 33, the steering angle of the vehicle from the steering angle sensor 35, and the vehicle speed of the vehicle from the vehicle speed sensor 37.

The display controller 7 performs display control for displaying an attention mark on the windshield so that the attention mark may be displayed in a superimposed manner close to a position on the windshield at which the driver sees the attention target. The attention mark is an image displayed to draw attention of the driver to the attention target.

Specifically, the display controller 7 first acquires 3D coordinates representing the position of the attention target from the image captured by the forward camera 31, and transforms the 3D coordinates into 2D coordinates representing a position on the windshield. Then, based on the 2D coordinates, the display controller 7 calculates a display position on the windshield at which the attention mark is displayed. In addition, based on the size of the attention target on the image, the display controller 7 calculates a display size in which the attention mark is displayed on the windshield. The display controller 7 then performs control so that the attention mark may be displayed on the windshield in a superimposed manner at the calculated display position, in the calculated display size. Specific processing is executed by the coordinate transformer 21, the display position calculator 23, and the display size calculator 25 that constitute the display controller 7.

The coordinate transformer 21 performs processing of transforming 3D coordinate data acquired by the forward camera 31 into 2D coordinates on the windshield of the vehicle.

Based on the 2D coordinates of the attention target on the windshield, the display position calculator 23 calculates the display position on the windshield at which the attention mark is displayed. In one or more embodiments of the present invention in particular, the display position calculator 23 sets a base point at the position of the attention target on the windshield, and sets a display position of the attention mark at a position which is a predetermined distance away from the base point. Then, the display position calculator 23 changes the display position of the attention mark by changing the predetermined distance according to the relative distance between the vehicle and the attention target. When the attention mark is displayed at the display position thus calculated, the attention mark is, from a point of view of the driver, displayed in a superimposed manner close to the attention target on the windshield.

Based on the size of the attention target on the image captured by the forward camera 31, the display size calculator 25 calculates the display size in which the attention mark is displayed on the windshield.

The image generator 9 generates, based on processing results obtained by the above parts, an image for the head-up display to display on the windshield of the vehicle.

The forward camera 31 is imaging means that captures a scene ahead of the vehicle, and is configured with a solid-state image pickup element such as a CCD or CMOS.

The inter-vehicle distance sensor 33 detects a preceding vehicle travelling ahead of the vehicle using a millimeter-wave radar, a CCD image sensor, an infrared radar, or the like, and measures the inter-vehicle distance between the vehicle and the preceding vehicle.

The steering angle sensor 35 detects the steering angle of the vehicle from the angle of rotation of the steering wheel.

The vehicle speed sensor 37 detects the vehicle speed of the vehicle from a pulse signal indicative of the number of rotations of an axle.

The HUD display unit 39 is a device for actually projecting an image generated by the image generator 9 onto the windshield, and is, for example, the projector constituting the head-up display.

The vehicular display apparatus 1 is configured with general-purpose electronic circuitry and peripherals including a microcomputer, a microprocessor, or a CPU. By executing particular programs, the vehicular display apparatus 1 operates as the attention target detector 3, the vehicle condition detector 5, the display controller 7, and the image generator 9 described above.

[Procedures for Image Generation Processing]

Next, procedures of image generation processing performed by the vehicular display apparatus according to one or more embodiments of the present invention are described with reference to a flowchart in FIG. 2.

Figure 2:
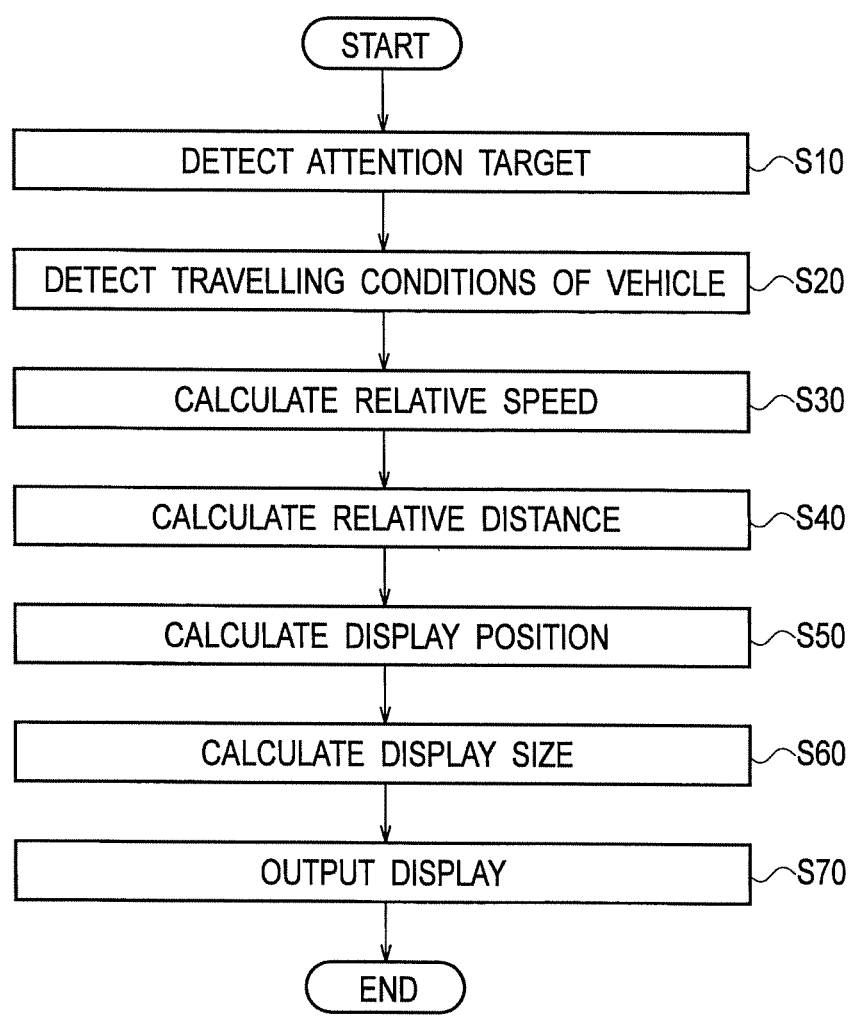
FIG. 2 is a flowchart illustrating processing procedures of image generation processing performed by the vehicular display apparatus according to one or more embodiments of the present invention.

As shown in FIG. 2, first in Step S10, the attention target detector 3 analyzes an image acquired from the forward camera 31 and detects an attention target to which attention of the driver of the vehicle needs to be drawn.

In Step S20, the vehicle condition detector 5 acquires data indicating the traveling conditions of the vehicle from the various sensors installed in the vehicle. The vehicle condition detector 5 may particularly acquire the inter-vehicle distance to a preceding vehicle travelling ahead from the inter-vehicle distance sensor 33, the steering angle of the vehicle from the steering angle sensor 35, and the vehicle speed of the vehicle from the vehicle speed sensor 37. The vehicle condition detector 5 may acquire the position of the vehicle from a GPS or the like.

In Step S30, the attention target detector 3 arranges images from the forward camera 31 chronologically, and based on the change in position of the attention target, calculates the relative speed of the attention target with respect to the vehicle. If the vehicle has a radar installed therein, the relative speed may be detected by the radar. In addition, if the attention target is a vehicle travelling ahead, the relative speed may be calculated based on information from the inter-vehicle distance sensor 33.

In Step S40, the attention target detector 3 analyzes the images from the forward camera 31 and thereby calculates the relative distance from the vehicle to the attention target. For this process, the attention target detector 3 obtains the direction to the attention target and specifies the relative position of the attention target with respect to the vehicle. The attention target detector 3 also calculates the size of the attention target based on the size of the attention target on the image. If the vehicle has a radar installed therein, these pieces of information may be detected with the radar. In addition, if the attention target is a vehicle travelling ahead, the relative distance may be calculated based on information from the inter-vehicle distance sensor 33. Furthermore, the attention target detector 3 may correct the relative distance in real time according to the relative speed.

In Step S50, the display controller 7 calculates a display position at which an attention mark is displayed in a superimposed manner close to the attention target. First, the coordinate transformer 21 transforms 3D coordinate data acquired by the forward camera 31 into 2D coordinate data on the windshield of the vehicle. Thereby, the 3D coordinates indicating the position of the attention target are transformed into 2D coordinates indicating a position on the windshield.

Then, based on the 2D coordinates of the attention target on the windshield, the display position calculator 23 calculates a display position on the windshield at which the attention mark is displayed.

Figure 3:
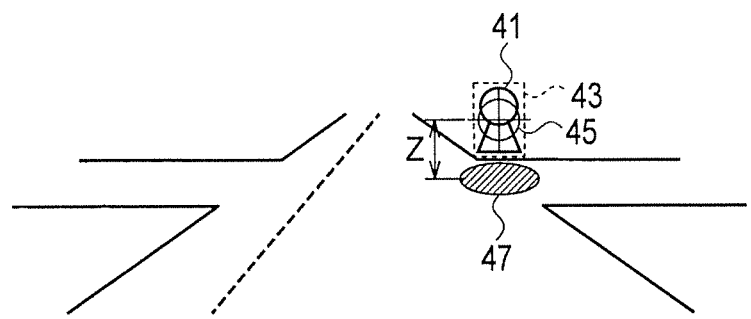
FIG. 3 is a diagram illustrating how the vehicular display apparatus according to one or more embodiments of the present invention displays an attention mark.

With reference to FIG. 3, a description is given of how to calculate the display position for the attention mark. As shown in FIG. 3, when an attention target 41 is a pedestrian, the display position calculator 23 sets, on an image from the forward camera 31, a rectangular frame 43 surrounding the attention target 41, and sets a base point 45 at the center of the frame 43. The display position calculator 23 calculates a position a predetermined distance Z away from the base point 45 downwardly as the display position of an attention mark 47. When the attention mark 47 is displayed at the display position thus calculated, the attention mark 47 is, from a point of view of the driver, displayed in a superimposed manner close to the attention target 41.

Even in a case where multiple attention targets exist ahead of the vehicle, their attention marks are less likely to be displayed in an overlapping manner when the attention mark 47 is thus displayed below the attention target 41. Although oval in FIG. 3, the attention mark 47 may be a straight line or other shape such as a triangle, a star, or an arrow.

Figure 4A:
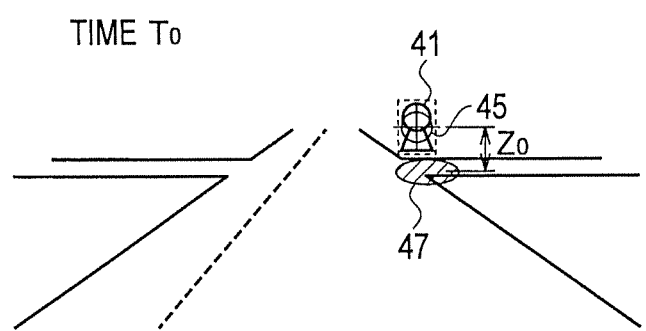
FIGS. 4A-4B are diagrams illustrating how the vehicular display apparatus according to one or more embodiments of the present invention changes a display position of the attention mark.
Figure 4B:
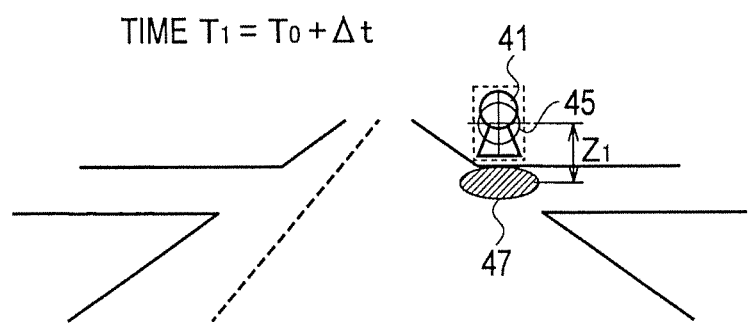

Further, the display position calculator 23 changes the predetermined distance Z between the position of the attention target on the windshield and the display position of the attention mark, according to the relative distance. Specifically, the display position calculator 23 increases the predetermined distance Z as the attention target approaches the vehicle, i.e., the relative distance decreases. As shown in FIG. 4A for example, at time T0 when the attention target 41 is situated away from the vehicle, i.e., the relative distance is large, the display position calculator 23 sets small predetermined distance Z0. At time T1 after a lapse of time Δt (T1=T0+Δt), the attention target 41 approaches the vehicle, i.e., the relative distance decreases, as shown in FIG. 4B. Then, the display position calculator 23 changes and sets the predetermined distance to Z1 (>Z0) by increasing the predetermined distance according to the decrease in the relative distance, and thereby changes the display position.

Conventionally, an attention mark is displayed at a position a certain distance away from an attention target, irrespective of the relative distance between the attention target and the vehicle. Thus, when the attention target approaches the vehicle and appears larger, the attention mark would be displayed over the attention target and hides the actual attention target such as a pedestrian or vehicle, disabling the driver from seeing the attention target directly. When, as described above, the predetermined distance Z between the base point 45 and the attention mark 47 is increased according to a decrease in the relative distance, the change in the relative distance between the attention target and the vehicle does not cause the attention mark to be displayed over the attention target. Thus, even when the relative distance changes, the attention mark can be displayed at an appropriate position, allowing the driver to always see the attention target.

Figure 5A:
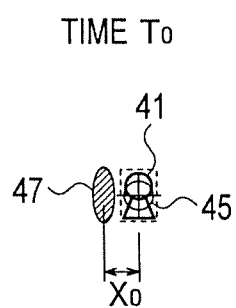
FIGS. 5A-5B are diagrams illustrating how the vehicular display apparatus according to the embodiment of the present invention changes the display position of the attention mark.
Figure 5B:
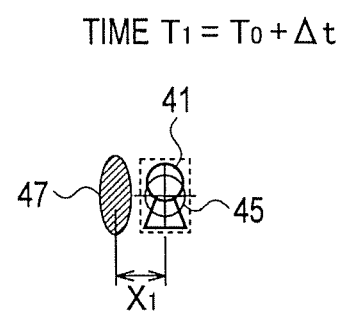

The display position calculator 23 may display the attention mark horizontally next to the attention target. As shown in FIG. 5A for example, at time T0 when the attention target 41 is situated away from the vehicle, i.e., the relative distance is large, the attention mark 47 is displayed at a position a predetermined distance X0 away from the attention target horizontally. At time T1 after a lapse of time Δt (T1=T0+Δt), the attention target 41 approaches the vehicle, i.e., the relative distance decreases, as shown in FIG. 5B. Then, the display position calculator 23 changes and sets the predetermined distance to X1 (>X0) by increasing the predetermined distance according to the decrease in the relative distance, and thereby changes the display position.

When the attention mark is thus displayed horizontally next to the attention target, even in a case where multiple attention targets exist in the travelling direction of the vehicle, their attention marks are less likely to be displayed in an overlapping manner.

Figure 6A:
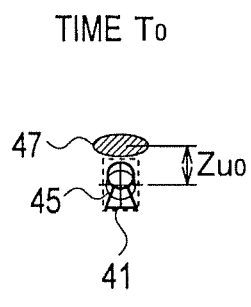
FIGS. 6A-6B are diagrams illustrating how the vehicular display apparatus according to one or more embodiments of the present invention changes the display position of the attention mark.
Figure 6B:
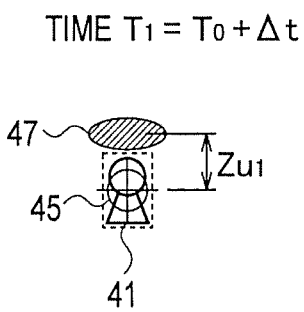

Alternatively, the display position calculator 23 may display the attention mark above the attention target. As shown in FIG. 6A for example, at time T0 when the attention target 41 is situated away from the vehicle, i.e., the relative distance is large, the attention mark 47 is displayed at a position a predetermined distance Zu0 away from the attention target upward. At time T1 after a lapse of time Δt (T1=T0+Δt), the attention target 41 approaches the vehicle, i.e., the relative distance decreases, as shown in FIG. 6B. Then, the display position calculator 23 changes and sets the predetermined distance to Zu1 (>Zu0) by increasing the predetermined distance according to the decrease in the relative distance, and thereby changes the display position.

Even in a case where multiple attention targets exist ahead of the vehicle, their attention marks are less likely to be displayed in an overlapping manner when the attention mark is thus displayed above the attention target.

Moreover, the display position calculator 23 may correct the display position of the attention mark when there is a time difference between detection of the attention target and display of the attention mark. For example, the display position of the attention mark is corrected toward the vehicle depending on the length of the time difference. If the vehicle speed of the vehicle is high, the display position of the attention mark is corrected toward the vehicle more.

In Step S60, the display controller 7 calculates a display size of the attention mark. The display size calculator 25 of the display controller 7 calculates the display size in which the attention mark is displayed on the windshield, based on the size of the attention target on the image. In FIG. 3, the display size of the attention mark 47 is set to be slightly wider than the frame 43 which indicates the size of the attention target 41. Instead, the display size of the attention mark 47 may be set to be as wide as or slightly narrower than the frame 43.

In Step S70, the image generator 9 generates an image of the attention mark so that the attention mark may be displayed using the display position and the display size which have been calculated by the foregoing processing, and outputs the image to the HUD display unit 39. The image generation processing according to one or more embodiments of the present invention thus ends.

Thereafter, the HUD display unit 39 projects the image of the attention mark onto the windshield, so that a virtual image of the attention mark is displayed close to the attention target in a superimposed manner.

As described above in detail, the vehicular display apparatus 1 according to one or more embodiments of the present invention sets the base point at the position of the attention target on the windshield, and sets the display position of the attention mark at a position which is a predetermined distance away from the base point. Then, the vehicular display apparatus 1 changes the display position of the attention mark by changing the predetermined distance according to the relative distance. Thus, even when the relative distance between the attention target and the vehicle changes, the attention mark can always be displayed at an appropriate position.

Moreover, the vehicular display apparatus 1 according to one or more embodiments of the present invention displays the attention mark below the attention target. Thus, even in a case where multiple attention targets exist ahead of the vehicle, their attention marks are less likely to be displayed in an overlapping manner.

Moreover, the vehicular display apparatus 1 according to one or more embodiments of the present invention displays the attention mark horizontally next to the attention target. Thus, even in a case where multiple attention targets exist in the travelling direction of the vehicle, their attention marks are less likely to be displayed in an overlapping manner.

Moreover, the vehicular display apparatus 1 according to one or more embodiments of the present invention displays the attention mark above the attention target. Thus, even in a case where multiple attention targets exist ahead of the vehicle, their attention marks are less likely to be displayed in an overlapping manner.

Furthermore, the vehicular display apparatus 1 according to one or more embodiments of the present invention corrects the display position of the attention mark according to a time difference between detection of the attention target and display of the attention mark. Thus, the attention mark can be displayed at an appropriate position irrespective of the time difference.

It should be noted that the above embodiments are just examples of the present invention. The present invention is not limited to the above embodiments and can be implemented in modes other than the above embodiments by various modifications which are made depending on design or the like without departing from the technical concept of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 vehicular display apparatus
3 attention target detector
5 vehicle condition detector
7 display controller
9 image generator
21 coordinate transformer
23 display position calculator
25 display size calculator
31 forward camera
33 inter-vehicle distance sensor
35 steering angle sensor
37 vehicle speed sensor
39 HUD display unit

The invention claimed is:

1. A vehicular display apparatus that displays an image on a windshield of a vehicle, the vehicular display apparatus comprising:
an attention target detector configured to detect an attention target to which attention of a driver of the vehicle needs to be drawn, and calculate a distance from the attention target to the vehicle; and
a display controller configured to display an attention mark close to the attention target on the windshield such that, from a point of view of the driver, the attention mark is displayed at a position that is a predetermined distance away from the attention target detected by the attention target detector, the attention mark being displayed to draw the attention of the driver to the attention target,
wherein the display controller changes the display position of the attention mark by changing the predetermined distance according to the distance from the attention target to the vehicle,
wherein the display controller corrects the display position of the attention mark by changing the display position of thereof according to a time difference between detection of the attention target and display of the attention mark,
wherein the display controller corrects the display position of the attention mark corrected according to the time difference according to a vehicle speed of the vehicle at a time when the attention target is detected, and
wherein the display controller sets the display position of the attention mark at a position which is the predetermined distance away from the attention target and is below the attention target.

2. A vehicular display apparatus that displays an image on a windshield of a vehicle, the vehicular display apparatus comprising:
an attention target detector configured to detect an attention target to which attention of a driver of the vehicle needs to be drawn, and calculate a distance from the attention target to the vehicle; and
a display controller configured to display an attention mark close to the attention target on the windshield such that, from a point of view of the driver, the attention mark is displayed at a position that is a predetermined distance away from the attention target detected by the attention target detector, the attention mark being displayed to draw the attention of the driver to the attention target,
wherein the display controller changes the display position of the attention mark by changing the predetermined distance according to the distance from the attention target to the vehicle,
wherein the display controller corrects the display position of the attention mark by changing the display position of thereof according to a time difference between detection of the attention target and display of the attention mark,
wherein the display controller corrects the display position of the attention mark corrected according to the time difference according to a vehicle speed of the vehicle at a time when the attention target is detected, and
wherein the display controller sets the display position of the attention mark at a position which is the predetermined distance away from the attention target and is horizontally next to the attention target.

* * * * *